J. F. O'CONNOR.
SIDE BEARING FOR RAILWAY CARS.
APPLICATION FILED JUNE 14, 1917.
1,257,921.
Patented Feb. 26, 1918.
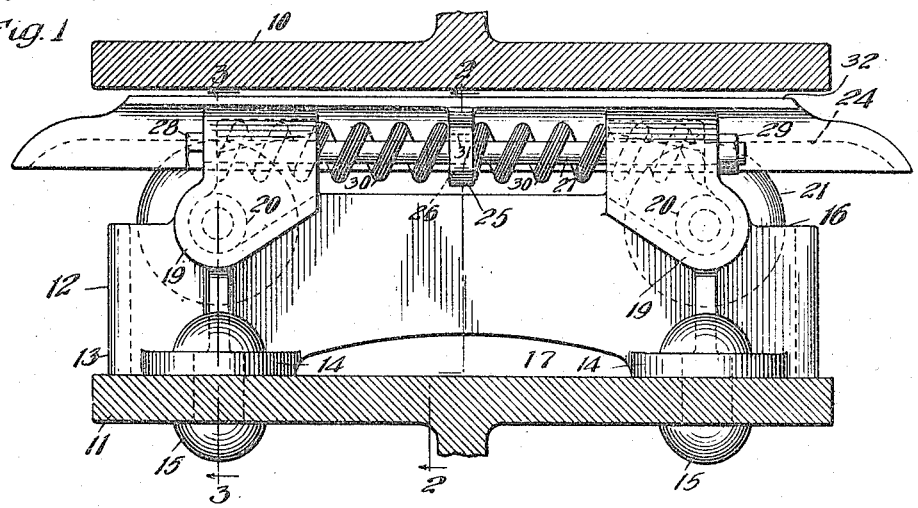
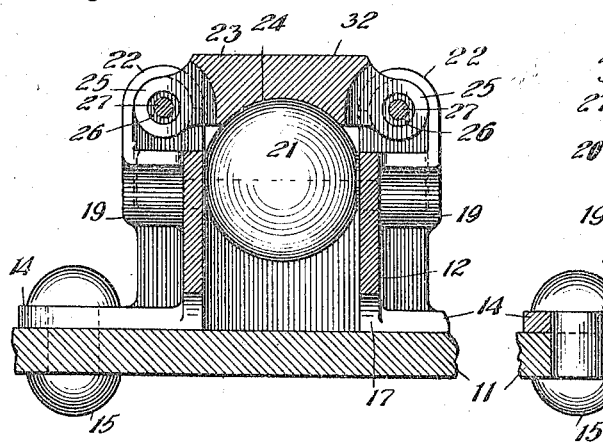
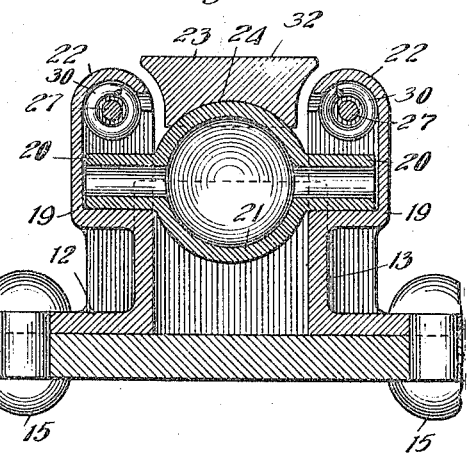
WITNESS
Wm. Geiger
INVENTOR.
John F. O'Connor
BY George I. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SIDE BEARING FOR RAILWAY-CARS.

1,257,921.  Specification of Letters Patent.  Patented Feb. 26, 1918.

Application filed June 14, 1917. Serial No. 174,677.

*To all whom it may concern:*

Be it known that I, JOHN F. O'CONNOR, a citizen of the United States, residing at Chicago, in the county of Cook and State of Illinois, have invented a certain new and useful Improvement in Side Bearings for Railway-Cars, of which the following is a full, clear, concise, and exact description, reference being had to the accompanying drawings, forming a part of this specification.

My invention relates to improvements in side bearings for railway cars.

The object of my invention is to provide an efficient laterally adjustable side bearing.

In the drawings forming a part of this specification, Figure 1 is a side elevation of a side bearing embodying my invention; Fig. 2 is a cross section taken on line 2—2 of Fig. 1; Fig. 3 is a cross section taken on line 3—3 of Fig. 1.

Referring to the drawings, the numeral 10 indicates one of the bolsters of a railway car shown in cross section, as, for instance, the upper or body bolster, and 11 refers to the opposed bolster shown in cross section, as, for instance, the lower or truck bolster. The side bearing is indicated at 12, and comprises a base member 13 adapted to be secured to one of the bolsters, as, for instance, the body bolster 11, by means of the flanges 14 provided thereon and the rivets 15. The base member is of a general hollow box-like shape, open on its upper side 16, and when applied to a bolster is provided with the lower lateral openings 17 to permit the passage of dirt, cinders or other foreign material. The base member is provided near each of its ends with the bearings 19—19 to receive the journals 20 with which the ends of each of the spherical rollers 21 are provided. Near its ends the base member is provided upon either side with the upstanding brackets 22—22 between which the movable bearing plate 23, which is longitudinally extended in reference to the base member, is designed to operate. The said bearing plate has upon its under surface the arcuate bearing face 24 designed to ride upon the spherical rollers 21. Intermediate its ends the movable bearing plate 23 is provided with the lateral flanges 25 perforated as at 26 for the passage of a spring bolt 27 which passes through the brackets 22, the said bolt being provided with a head 28 at one end and a nut 29 at the other end, the head and nut being on the outer faces of the brackets with which they are associated, each of said spring bolts 27 bearing a spring 30, the said springs 30 being seated between the flange 25 at one end and against one of the brackets 22 at the other end. The perforations in the brackets 22 or flange 25 for the passage of the spring bolt 27 are enlarged preferably at the point of passage through the flange 25, as indicated by the dotted lines referenced 31 in Fig. 1 of the drawing, to permit the lateral oscillation of the bearing plate 23. The upper face 32 of the bearing plate is adapted to be engaged by the opposed bolster, as, for instance, the bolster 10, and upon such engagement the movable plate 23 rides longitudinally of the base member, friction being prevented through the rotation of the rollers 21. Upon any relative deflection of the bolsters, the upper face of the movable bearing plate 23 is adapted to oscillate laterally to accommodate its bolster bearing face 34 to the opposed bolster by reason of the arcuate form of its lower face which rides upon the spherical rollers 21.

In its normal position, the plate 23 is as shown in Fig. 1 of the drawings, but upon longitudinal movement in either direction the springs 30 against which it moves are compressed between the flange 25 and the bracket 22 against which the compressed spring is seated at the other end, so that upon release of the bearing plate and its opposed bolster the springs will return the bearing plate 23 to its normal position.

I claim:

1. In a side bearing for railway cars, a base member, a bolster to which the base member is secured, an opposed bolster, a bearing plate adapted to engage said opposed bolster, a spherical roller mounted in the base member, the bearing plate riding upon said roller and having lateral and longitudinal movement thereon.

2. In a side bearing for railway cars, a base member, a spherical roller mounted therein, a bearing plate adapted to engage said roller, said bearing plate having both longitudinal and lateral movement upon said roller.

3. In a side bearing for railway cars, in combination: a base member, a spherical roller rotatably journaled to said base member, a bearing plate associated with said roller, the said bearing plate having an arcuate face engaging said roller and having both longitudinal and lateral movement upon said roller.

4. In a side bearing for railway cars, in combination: a base member, a roller comprising a sphere and journals mounted in said base member, a bearing plate mounted upon said roller, the said bearing plate having an arcuate face engaging the roller and having both longitudinal and lateral movement upon said roller.

5. In a side bearing for railway cars, a base member adapted to be secured to a bolster, a bearing plate associated with said base member and adapted to be engaged by an opposed bolster, a plurality of rollers mounted in the base member, spring means associated with the bearing plate to resist the longitudinal movement thereof, the bearing plate having both a longitudinal and a lateral movement upon said roller.

6. In a side bearing for railway cars, in combination: a base member, a bolster to which the base member is secured, an opposed bolster, a bearing plate associated with the base member adapted to engage the opposed bolster, the base member being provided with brackets forming spring seats, springs for said seats, the bearing plate having a member engaging said springs, the base member being further provided with rollers, the rollers having a spherical face, the bearing plate having an arcuate surface engaging the rollers whereby the said plate may move longitudinally and laterally upon said rollers.

7. In a side bearing for railway cars, in combination: a base member, brackets at the end of said base member, rollers revolubly mounted in the base member, a bearing plate associated with said rollers, a spring bolt and springs, the bearing plate being provided with a flange, springs being mounted between said flange and the brackets upon the base member, the rollers having a spherical portion, the bearing plate having an arcuate bearing face adapted to engage the rollers whereby the bearing plate may move laterally and longitudinally upon said rollers.

In witness that I claim the foregoing I have hereunto subscribed my name this 26th day of May, 1917.

JOHN F. O'CONNOR.

Copies of this patent may be obtained for five cents each, by addressing the "Commissioner of Patents, Washington, D. C."